Patented Feb. 8, 1949

2,460,891

UNITED STATES PATENT OFFICE 2,460,891

SEPARATION OF PROTEINS FROM MILK PRODUCTS

Abraham Leviton, Washington, D. C., assignor to the United States of America as represented by the Secretary of Agriculture No Drawing. Application October 8, 1946, Serial No. 701,856

1 Claim. (Cl. 127—31)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the separation of milk proteins, including casein, and the separation of lactose from milk products containing them, and has among its objects improvements in the process disclosed in United States Patent No. 2,129,222, particularly relative to obtaining proteins containing casein in a water-soluble or water-suspensible, substantially unchanged form from a milk product containing casein, preferably dry skim milk powder, and to obtaining lactose in high yields and in substantially pure form.

According to the patent above mentioned, a milk product, such as raw skim milk, whey, concentrated skim milk or whey, whey powder, or the like, is mixed at room temperature with an ethanol-water solution, the proportions of ethanol and water being chosen to give a concentration in the mixture of at least four parts by volume of 95 percent ethanol to one part of water (concentration of at least 70.7 percent by weight). With this treatment, a major portion of the lactose and milk salts is dissolved by the ethanol-water solution and the proteins are precipitated. The protein precipitate is rapidly removed by filtration. However, in the case of use of a milk product containing casein such as skim milk, skim milk concentrate or skim milk powder, the nature of the protein complex is changed by the process in that it is rendered highly indispersible.

According to the present invention, the process is so modified that the casein as well as the other proteins are separated from the milk product in a water-soluble or water-suspensible, substantially unchanged form, and substantially pure lactose is recovered in a high yield. This is accomplished by use of a methanol-water solution as a lactose and milk salt solvent at a particular range of concentrations and at a low temperature (not over 0° C.), and by immediately separating the formed protein precipitate from the methanol solution.

Upon mixing the methanol-water solution with the milk product having dispersed proteins, the proteins suddenly precipitate in high yields, and by quick separation of them, as by filtering or centrifuging, a protein filter cake, substantially free from lactose and milk salts, is obtained. This protein product may be mixed with water to give a mixture in which the non-casein proteins are in solution and the casein is in solution or suspension in a form quite similar to that of the original skim milk. This is indicated by the fact that the casein is easily precipitated by adjusting the pH to 4.7, the fact that the non-casein proteins are not precipitated in their isoelectric range, that they are coagulated on heating, and are precipitated in highly concentrated ($NH_4SO_4$) solutions, and by the similarity of light scattering over a wide spectral range to that of the original milk.

The lactose is readily separated from the filtrate.

The following three example exhibit separation of the proteins from milk products in which the proteins are dispersed:

Example I

A 100 ml. portion of skim milk at a temperature of 0° C. was added slowly with agitation to a 900 ml. portion of a methanol-water solution of 99.5 percent by weight concentration at a temperature of —15° C., giving a suspension of milk solids in a methanol-water solution having a methanol concentration of 89.0 percent by weight. The protein precipitated and was immediately separated from the mixture by centrifuging. The separated protein precipitate was dissolved in 100 ml. of water at 5° C. and concentrated under vacuum to remove methanol occluded in the separated precipitate. The protein in suspension thus obtained may be substantially completely dried, as by spray drying, and packed for preservation in this form.

Analysis indicated that the protein precipitate as obtained above contained approximately 45 percent of the solids and 92 percent of the proteins originally present in the milk. It was practically free of lactose and water-soluble salts of the milk. About 80 percent of the protein precipitate was casein, as indicated by the fact that about 80 percent was precipitated upon adjustment of the water solution of it to a pH of 4.7 by the addition of the required quantity of a molar sodium acetate buffer.

The water solution of the protein precipitate was centrifuged at 3500 R. P. M. in a high-speed centrifuge for 15 minutes. No sediment formed, thus indicating that the protein precipitate was essentially water soluble.

Instead of skim milk as in Example I, evaporated milk products containing casein may be used. This is further exhibited in the following Examples II and III.

Example II

Following in general the procedure of Example I, a 100 ml. portion of evaporated skim milk containing 18 percent solids was added to a 900 ml. portion of a 99.5 percent methanol solution, giving a suspension of milk solids in a methanol-water solution having a methanol concentration of 89.2 percent by weight, thus to precipitate the proteins.

Analysis indicated that the protein precipitate thus obtained contained approximately 44 percent of the solids and 92 percent of the proteins originally present in the milk, essentially equivalent to the results of Example I.

Example III

Following in general the same procedure, a 100 ml. portion of evaporated skim milk containing 28 percent solids was added to a 900 ml. portion of a 99.5 percent methanol-water solution giving a suspension of milk solids in a methanol-water solution having a methanol concentration of 90.5 percent by weight, thus to precipitate the proteins.

Analysis indicated results comparable to those of Example II.

The protein precipitate obtained in Examples II and III may be further treated to remove occluded methanol and dried in a manner similar to that described in Example I.

According to the above examples, it will be noted that the concentration of methanol relative to water in the suspension of milk solids in the methanol-water solution at which precipitation of the proteins occurs ranges from 89 to 90.5 percent by weight. The range may be varied somewhat, but the lowest definite minimum value permissible is about 77 percent with skim milk if immediate and substantial precipitation is to be obtained.

It has further been found that above this minimum value in the case of skim milk precipitation occurs selectively; that is, at lower concentrations within the operable range, fractions precipitate which are richer in large protein particles (particles of higher molecular weight), and as the methanol concentration increases, particles of lower molecular weight are also precipitated.

It is therefore possible to separate the proteins into fractions having different mean molecular weights by first forming the milk-methanol-water mixture of a certain methanol concentration near the lower end of the operable concentration range and at a low temperature, separating the precipitate thus formed and then increasing the methanol concentration of the remaining mixture, thus to precipitate a fraction of lower mean molecular weight. The procedure may be repeated a number of times and with as small variation of methanol concentration as desired, thus to give a corresponding number of fractions.

This is further exhibited in the following Example IV:

Example IV

A 10 ml. portion of skim milk at 0° C. was added as in Example I to an 80 ml. methanol and 10 ml. water solution at −17° C., giving a resulting mixture having a suspension of milk solids in a methanol-water solution having a methanol concentration of 76.8 percent by weight. At this concentration, no immediate precipitation of proteins occurred. However, by increasing the methanol concentration, precipitation occurs, the mean molecular weight of the precipitated protein depending on the concentration employed, as shown in the following table:

| Methanol concentration, per cent | Total solids of milk precipitated, per cent | Mean molecular weight of the proteins precipitated |
| --- | --- | --- |
| 76.8 | none | |
| 79.2 | 32 | $3.9 \times 10^8$ |
| 80.4 | 57 | $2.46 \times 10^8$ |
| 88.9 | 100 | $1.90 \times 10^8$ |

The above data referred to fractions which precipitate suddenly upon forming the milk-methanol-water mixture, and are immediately separated therefrom. It has been found that there is a time factor involved, since the larger particles precipitate more rapidly than the small ones. Thus, if the mixture is left standing for sometime, the fraction then separated will be of somewhat lesser mean molecular weight. Accordingly, it is possible to fractionate with a particular methanol concentration by first separating a fraction of larger molecules from a given milk-methanol-water mixture, and then permitting the remaining mixture to stand for a time followed by separation of the precipitate of the smaller molecules then formed.

However, from the standpoint of obtaining casein in undenatured form, it is not desirable to permit standing for any appreciable length of time, since long contact of the casein with the methanol tends to denature the casein.

The examples above use milk products in which the proteins are in solution and are precipitated therefrom by the methanol. It is preferable, from the standpoint of commercial production, to use skim milk powder, and the invention claimed relates to this. In this case the proteins are not initially in solution, and the process is essentially one of solvent extraction of the lactose and milk salt from the skim milk powder. This necessitates the use of a range of methanol concentration different from that employed with the whole or the evaporated skim milk.

With skim milk powder, the lowest concentration of methanol permissible is about 40 per cent by weight, since below this the proteins tend to be dissolved along with the lactose and milk salts. The concentration may be not higher than about 62 percent, since above this the lactose is not efficiently extracted. The preferred temperature is about −16° C.

Use of skim milk powder is further exhibited in Example V.

Example V

A 50 gm. portion of spray-dried skim milk powder was slowly stirred into an 830 gm. portion of a methanol-water solution of 58 percent by weight concentration at −15° C., giving a suspension of milk solids in a methanol-water solution having a methanol concentration of 57.5 percent by weight. In about 1 minute, the proteins precipitated, and the precipitate was separated from the methanol solution.

Analysis indicated that the protein precipitate thus obtained contained about 46 percent of the solids and 92 percent of the proteins originally present in the milk powder, results essentially equivalent to those of Example I.

In the foregoing examples, the data concerning the lactose were not taken. Example VI exhibits the invention in more detail as to the recovery and results relative to the lactose.

*Example VI*

A 50 gm. portion of spray-dried skim milk powder was slowly stirred into a 500 ml. portion of a methanol-water solution of 62 percent by weight concentration at −17° C. The proteins, precipitated as in Example V, were filtered out of the solution, and the filter cake washed with 50 ml. of 62 percent methanol.

In order to separate the lactose from the remaining methanol solution, the filtrates were combined and 0.5 ml. of concentrated HCl per 100 ml. of filtrate was added, the mixture being stirred in the cold for about 15 hours, whereupon the lactose crystallized, was filtered out, washed and dried.

The lactose thus obtained represents 65 percent of that present in the original skim milk and has an ash content of 0.02 percent. It can be dissolved in water to yield a water-clear 30 percent solution which gives a negative test for proteins with a trichloracetic acid test. It meets specifications for a chemically pure lactose.

Having thus described the invention, what is claimed is:

A process comprising mixing dried skim milk powder with a methanol-water solution having a methanol concentration of about from 40 to 62 percent by weight at a temperature about −16° C. to precipitate the proteins and dissolve the lactose in the methanol-water solution, immediately separating the protein precipitate from the solution, and separating the lactose from the remaining solution.

ABRAHAM LEVITON.

REFERENCES CITED

The following references are of record in the file of this patent:

UNITED STATES PATENTS

| Number | Name | Date |
|---|---|---|
| 2,116,931 | Leviton | May 10, 1938 |

FOREIGN PATENTS

| Number | Country | Date |
|---|---|---|
| 12,855 | Great Britain | 1910 |

OTHER REFERENCES

Leviton et al., "Separation of Lactose and Soluble Proteins of Whey by Alcohol Extraction," Ind. and Eng. Chem., November 1938, pages 1305–1311.